US009408071B2

(12) United States Patent
Sanyal et al.

(10) Patent No.: US 9,408,071 B2
(45) Date of Patent: Aug. 2, 2016

(54) SYSTEM AND METHOD FOR APN CORRECTION IN GTP MESSAGES ASSOCIATED WITH GPRS DATA SERVICES OFFERED BY MOBILE OPERATOR USING A SPONSOR NETWORK

(71) Applicants: Rajarshi Sanyal, Brussels (BE); Pascal Alloin, Brussels (BE)

(72) Inventors: Rajarshi Sanyal, Brussels (BE); Pascal Alloin, Brussels (BE)

(73) Assignee: Belgacom International Carrier Services, Brussels (BE)

( * ) Notice: Subject to any disclaimer, the term of this patent is extended or adjusted under 35 U.S.C. 154(b) by 95 days.

(21) Appl. No.: 14/396,846

(22) PCT Filed: Apr. 26, 2013

(86) PCT No.: PCT/EP2013/058772
§ 371 (c)(1),
(2) Date: Oct. 24, 2014

(87) PCT Pub. No.: WO2013/160461
PCT Pub. Date: Oct. 31, 2013

(65) Prior Publication Data
US 2015/0078288 A1    Mar. 19, 2015

(30) Foreign Application Priority Data
Apr. 26, 2012    (EP) .................................. 12165731

(51) Int. Cl.
*H04W 12/06*    (2009.01)
*H04W 8/26*    (2009.01)
(Continued)

(52) U.S. Cl.
CPC ................ *H04W 8/26* (2013.01); *H04W 4/003* (2013.01); *H04W 8/02* (2013.01); *H04W 76/02* (2013.01);
(Continued)

(58) Field of Classification Search
CPC ......... H04W 8/26; H04W 88/08; H04W 8/02; H04W 76/02; H04W 4/003; H04W 76/022; H04W 8/082; H04W 92/24; H04W 48/17
See application file for complete search history.

(56) References Cited

U.S. PATENT DOCUMENTS 6,853,648 B1   2/2005 Krstanovski et al.
8,472,384 B2 *  6/2013 Shu .......................... H04L 63/30
                                                          370/328

(Continued)

FOREIGN PATENT DOCUMENTS

WO    WO 2011/080744 A1    7/2011

OTHER PUBLICATIONS

International Search Report within the European Patent Office, completed Jul. 22, 2013 for International Application No. PCT/EP2013/058772.

Primary Examiner — Jay P Patel
(74) Attorney, Agent, or Firm — Leydig, Voit & Mayer, Ltd

(57) ABSTRACT

In a method and system for APN (Access Point Name) correction in a GPRS data roaming scenario where a sponsor operator network is used and a method and system for routing GTP messages to the correct destination network entity after actuating the APN correction as and when required. The GTP filter checks the IMSI and APN data in the GTP layer and, depending on the IMSI and APN data performs APN correction and manipulates GTP parameters to ensure the PDP Context is correctly established between the SGSN and the GGSN, and the further GTP Control or Data messages bypass the GTP Filter application. This solution allows appropriate routing of message, in particular for message to and from smartphone.

17 Claims, 4 Drawing Sheets

(51) Int. Cl.
  *H04W 76/02*  (2009.01)
  *H04W 4/00*  (2009.01)
  *H04W 8/02*  (2009.01)
  *H04W 88/08*  (2009.01)
  *H04W 8/08*  (2009.01)
  *H04W 48/00*  (2009.01)
  *H04W 92/24*  (2009.01)
(52) U.S. Cl.
  CPC ............ *H04W 76/022* (2013.01); *H04W 88/08* (2013.01); *H04W 8/082* (2013.01); *H04W 48/17* (2013.01); *H04W 92/24* (2013.01)

(56) References Cited

U.S. PATENT DOCUMENTS

| | | | | |
|---|---|---|---|---|
| 2003/0002480 A1* | 1/2003 | Giustina | ............. | H04L 29/1216 370/352 |
| 2003/0081607 A1* | 5/2003 | Kavanagh | ........... | H04L 63/0227 370/392 |
| 2004/0224680 A1 | 11/2004 | Jiang | | |
| 2006/0104262 A1* | 5/2006 | Kant | ..................... | H04W 8/087 370/352 |
| 2007/0019643 A1* | 1/2007 | Shaheen | ............... | H04W 60/00 370/389 |
| 2008/0031215 A1* | 2/2008 | Joung | .................. | H04W 24/08 370/342 |
| 2009/0042570 A1* | 2/2009 | Hurtta | ................... | H04W 60/00 455/435.2 |
| 2009/0069010 A1* | 3/2009 | Machida | ................. | H04W 8/06 455/433 |
| 2012/0009937 A1* | 1/2012 | Daly | .................... | H04W 48/04 455/456.1 |
| 2012/0246325 A1* | 9/2012 | Pancorbo Marcos | ............... | H04L 12/2602 709/227 |
| 2013/0155948 A1* | 6/2013 | Pinheiro | ............... | H04W 4/005 370/328 |
| 2013/0272136 A1* | 10/2013 | Ali | ........................ | H04W 24/08 370/241 |
| 2013/0329653 A1* | 12/2013 | Russell, Jr. | ............ | H04W 4/005 370/329 |

* cited by examiner

SYSTEM AND METHOD FOR APN CORRECTION IN GTP MESSAGES ASSOCIATED WITH GPRS DATA SERVICES OFFERED BY MOBILE OPERATOR USING A SPONSOR NETWORK

FIELD OF THE INVENTION

The invention relates to a method for APN (Access Point Name) correction in a GPRS roaming relationship where a sponsor operator network is used.

Further, the invention relates to a system for APN (Access Point Name) correction in GTP (GPRS Tunnelling Protocol) message in a roaming relationship established through Dual/Multi IMSI roaming solution where a sponsor operator network is used.

Furthermore, the invention relates to a system for APN (Access Point Name) correction in GTP message to enable GPRS service for devices served by a MVNO/E (Mobile virtual network operator/enabler) using the IMSI of a sponsor operator.

The invention also relates to a method for conveying GTP (GPRS Tunnelling Protocol) messages between a serving GPRS support node (SGSN) and Dual/Multi IMSI platform in a roaming relationship for Dual IMSI scenario wherein a sponsor operator network is used.

The invention also relates to a method for conveying GTP (GPRS Tunnelling Protocol) messages between a serving GPRS support node (SGSN) and GGSN of a MVNO/E wherein the MVNO uses the IMSI of the sponsor, but has it own core network layer including GGSN

TECHNICAL BACKGROUND OF THE INVENTION

GPRS Roaming is an important aspect of modern telecommunications. Cellular devices are used more and more and not only for conversations but also for data transfer or to access services. With the advent of new generation of smart devices, like smartphones or tablet, it becomes essential that the intelligent applications installed on these devices perform flawlessly both for roaming and non-roaming scenarios. These applications usually exchange data traffic with a content server located on the internet cloud.

GPRS Roaming enables a cellular customer to access data services for pure browsing, exchanging MMS (Multi media service) for actuating applications based on data services outside the geographical coverage area of the home network.

But with the new generation of devices such as smartphones and tablets, data service is a problem when a sponsor network is used. It happens so because the APN is automatically modified by the device to the sponsor network APN which can cause the GTP traffic to fail.

Below the first time an acronym is used the full name is given between parentheses behind the acronym. Thereafter the acronym is used without given the full name.

Automatic APN (Access Point Name) modification is a problem in a roaming relationship with mobile devices such as for instance smartphones operating in GSM (Global System for Mobile Communications), UMTS (Universal Mobile Telecommunications Service) and LTE (Long term evolution) networks. The devices tend to automatically configure the GPRS (General Packet Radio Services) related parameters according to the IMSI (International Mobile Subscriber Identity) present in the SIM (Subscriber Identity Module) card which is chosen during the network acquisition process. Hence, when the IMSI that is chosen during the Location Update is not the HOME IMSI but the IMSI that belongs to another Sponsor Operator, the GPRS configurations that are activated inside the device will be with relation to the sponsor operator but NOT the client/home network. Thus the use of the sponsor network in such a scenario is the root cause of the problem. But using a sponsor network in roaming or MVNO/E scenarios is the recent trend as it allows faster implementation, ROI and has other business and operational benefits. Hence the solution to fix the issue of GPRS is mandatory as GPRS data services are not possible at present for roaming scenarios (in case of Dual/Multi IMSI solution) and for both roaming and non roaming scenarios in case of MVNO/E networks.

The above invokes problems for instance for at least the following two implementation scenarios.

Scenario 1 is in light of a Dual/Multi IMSI roaming solution where there are one or more IMSIs from other donor/sponsor networks in the SIM card (other than the basic Home IMSI) which are chosen by the mobile station to piggyback on the roaming relationships of these donors/sponsors. In such a scenario, the mobile devices such as smartphones automatically choose the APNs belonging to the sponsor network. If the HLR (Home Location Register) is able to download the Sponsor network APNs in the SGSN during the GPRS Location update process, then the GTP (GPRS Tunnelling Protocol) messages are routed to the sponsor network GGSN instead of the home network. If the sponsor network is not configured to process the GTP messages of the client network (MVNO/E or Dual/Multi IMSI customer) using their IMSIs, the GTP messages fail. If the sponsor network is configured to process the GTP messages from the home networks using their IMSIs, then still Real time charging is an issue which can only be solved by an elaborate setup (Diameter/GTP'/INAP (Intelligent Network Application Protocol)/CAMEL (Customized Applications for Mobile network Enhanced Logic) based or proprietary solution.

Scenario 2 is for a MVNO/E (Mobile virtual network operator/enabler) implementation where the MVNO/E uses the IMSI of the Sponsor network but the same MVNO/E has their own core GPRS network which includes GGSN. If a GPRS GTP message is invoked from smartphones, the GTP messages will be wrongly routed to the sponsor network (which sponsors the IMSI) and not the MVNO network.

As stated above the problems related to GPRS service usage by devices such as smartphones are present in GSM, UMTS and LTE networks.

They are first discussed below for GSM networks for the Scenario 1.

In GSM there are several ways to establish roaming relationship between mobile operators. One way is to have direct bilateral roaming realised by direct signalling connectivity between mobile operators. In this case the Home IMSI (International Mobile Subscriber Identity) is used as an addressing parameter to identify a mobile user in a roaming network. The mobile operators need to maintain the logical or physical signalling connectivity one to one with the roaming partner networks to facilitate bilateral roaming. When there are many simultaneous roaming relationships such arrangements become difficult or unmanageable. The time taken to establish the new roaming relationships one by one will increase exponentially thus resulting in revenue loss. Another option is to connect to a roaming application and uses some other operator's IMSI, acting as a sponsor operator IMSI and piggyback on that sponsor operator's already established roaming relationship. This kind of roaming based on a sponsor IMSI is called Instant roaming based on Dual or Multiple IMSI's and is quite popular nowadays. This option is also promoted by European Union.

At present, GPRS data roaming in GSM/UMTS/LTE networks which is facilitated by the Dual/Multi IMSI solution has an issue when the transaction is invoked by some devices such as for instance a smartphone, instead of a conventional handset. Most of the smartphones have a permanent inbuilt database holding the GPRS parameters (like APN) mapped to the IMSI. So the smartphones automatically selects the GPRS data settings based on the IMSI chosen during network acquisition. For Dual/Multi IMSI SIM card, when the Sponsor IMSI is chosen at roaming location, the Sponsor network GPRS setting is chosen instead of Dual IMSI customer settings.

During the location update of the smartphone, if the HLR downloads the sponsor network APN to the SGSN in the visited PMN (Public Mobile Network) over the GSM MAP (Mobile Application Part) interface, the GTP control message is subsequently invoked during session establishment (i.e., Create PDP Context) by the SGSN over the Gn/Gp interface. But the messages are wrongly routed to Sponsor network GGSN (Gateway GPRS Support Node) instead of the Home Network GGSN. The Sponsor Network GGSN is not designed/configured to process traffic of some other networks, namely the Dual/Multi IMSI operator. Hence, GPRS data session attempts from those locations fail. This leads to a significant reduction of the reliability and customer friendliness of GPRS roaming service. Many cellular devices have this problem, such as nearly all of the present smart phones/tablets.

So to summarise, during roaming with sponsor IMSI, GPRS does not work with many devices such as smartphone and tablets which is a significant downside as most of the handsets that we see around are such devices. All the applications based on GRPS in said devices also will not work. Some devices where data roaming is essential will cease to be functional in the specific roaming location.

The smartphone or tablet manufacturers cannot change the behaviour of the handsets in the market, because there is already a high proliferation of these handsets in the market during last few years. Any significant change in the core operational logic in the handset may cost the manufacturers a fortune due to logistical requirements, interoperability issues and the cost for regression tests for each and individual model of the smartphone.

Compounding the problem is that the handset manufacturers are reluctant or unwilling to change the handset behaviour as it may well result in serious problems for the customers using conventional data roaming (not through the Multi/Dual IMSI) solutions and/or using GPRS at the home network. The GPRS settings of the handsets will change in such a case and hence their GPRS will be non usable unless they set up the settings manually. However, although many people use smartphones and similar devices only a small minority actually has the technical know-how to perform such acts.

The OS (Operating system) vendors, android/Symbian/windows/Mac cannot fix this easily by a patch or new release because of implementation issues, unknown side effects with other scenarios and also interoperability issues (handsets with the older versions). Also they do not desire to change the behaviour as it will result in serious problems for the customers using conventional data roaming (not through the Multi/Dual IMSI) solution and using GPRS at the home network. It is remarked that old versions of smartphones (prior to 2008) did not have a database to map the GRPS parameters to APN.

The handset manufacturers desired to make the handsets more intelligent and be less dependent on manual configuration processes or by Over the Air SMSs invoked by the Operators. But they may not have foreseen the side effect (automatic APN modification by device) in terms of rendering GPRS service via a sponsor network.

There are some existing solutions but they all show problems of their own:

The sponsor network GGSN can be configured to process the GPRS traffic of the Dual/Multi IMSI customer: Problem with this solution is that Prepaid charging (non CAMEL (Customized Applications for Mobile network Enhanced Logic)) cannot be supported, so that the solution is not implementable. There are serious billing impacts. The Sponsor network GGSN needs to be reengineered to serve the GRRS traffic of other networks. There are also security and fraud issues.

Scripting: Some Android/Symbian scripts can be developed to force the Home GPRS settings always. However this does not work in every Android/Symbian handsets. It also does not provide a solution for IPhones, windows phones and the smartphones which does not have an OS (Samsung Star for example).

SIM applet in the SIM card can force the Home APN during power up. The time needed to acquire networks increases greatfold resulting in poor QOS (Quality of Service) which will lead to customer's complaints. Some customers use Multi IMSI SIM cards and the problem will be magnified for such situation. It is not a fool proof solution as it is not agnostic to the handset behaviour and does not work for all handsets.

So there is a need for a solution that works universally, with all smartphones, all networks and across all categories of customers, whether prepaid or postpaid for instance.

For GPRS service for MVNOs/MVNEs (Mobile Virtual Network Enabler) similar problems occur:

Many MVNO/MVNEs do not have their own IMSI range. But they have IMSI range donated by a sponsor operator. The setup for such an MVNO can be as follows.

MVNO has the sponsor IMSI in the SIM card and defined in their profile existing in HLR MVNO has their own Core network setup, namely the GGSN.

MVNO has their own APN and does not the sponsor operator APN for data roaming

MVNO has however defined the sponsor operator APN or a wild card in the subscriber profile in the HLR so that the VLR can permit the GTP-C Create PDP Context to be invoked with the sponsor operator APN (applicable to smartphone case).

In this scenario, when the subscriber initiates a data session from home or from roaming location, the GTP message will be wrongly routed to the sponsor operator GGSN. This is because of the fact that the APN chosen by the smartphone will be the Sponsor Network APN and not the Home Network APN.

If the sponsor network GGSN is not configured to process the traffic from the MVNO/MVNE network, then the GTP traffic will fail. Hence GPRS service will not be possible from the devices such as smartphones.

Even if the Sponsor network GGSN is configured to process the traffic, still Real Time charging for prepaid will be quite difficult. To make it possible the Sponsor operator needs to establish a real time charging interface with the SCP of the Home Network. This also implies that the HPMN (MVNE/O)

also needs to share charging related sensitive information with the sponsor which may prove to be difficult from business perspective.

Hence there is still no fool proof solution which can ward of these intricate issues and makes the deployment of the GPRS service both for the sponsor and the MVNO/E simple.

Both scenarios have the common problem that the GTP message fails because they are wrongly routed to the sponsor operator GGSN.

SUMMARY OF THE INVENTION

The object of the invention is to provide for scenario 1, a solution for the Client/Home network without any requirement at the client operator end to implement any special software or hardware for enabling GPRS for smartphones and without the operator needing to consider any special setup for real time charging.

For scenario 2, the object of the invention is to provide a solution for the MVNOs to receive GPRS messages always towards their own core network even if the message is routed by the devices such as smartphones. After the message is routed through the GTP filter solution towards the GGSN of the MVNO/E, the GGSN will be agnostic of the fact that the GTP arriving from smartphones. Normalisation of the GTP parameter will be done by the GTP Filter application such that the GTP message arriving from devices such as smartphones looks similar to the GTP message arriving from conventional devices (which do not configure the APNs automatically).

To this end in the method for APN correction in a roaming relationship where a sponsor operator network is used, a GTP filter is provided wherein when a create PDP context from a serving GPRS support node arrives at the GTP filter, a check is performed by the GTP filter on IMSI and APN data in the GTP layer, wherein depending on the content of the IMSI and APN data in the GTP layer, the GTP filter modifies GTP parameters in the GTP control plane for routing the control plane traffic to the correct destination (Dual/Multi IMSI platform or GGSN of MVNO/E according to the implementation scenario) following an APN correction, while the data plane traffic is established directly between the serving GPRS support node and a gateway GPRS support node (for MVNO/E scenario or a Dual/Multi IMSI platform).

Manipulations in the GTP message by the GTP filter, examples of which will be given below in call flows, enables such effects.

This allows for a correct routing to solve the problem specified above.

In a first embodiment, wherein the IMSI in the incoming PDP context message belongs to a subscriber of a sponsor network and the APN belongs to the sponsor, the GTP filter performs no modification of the SGSN address in the GTP layer nor of the APN, populates the destination IP equal to the GGSN IP of the sponsor network in the IP layer and virtualizes sequence number to maintain the state and return the create PDP context response towards the SGSN which invoked the create PDP context message.

In a second embodiment, wherein the IMSI in the incoming PDP context message belongs to a subscriber of a Dual/Multi IMSI client or MVNO network and the APN belongs to the sponsor, the GTP filter performs:

no modification of the SGSN address in the GTP layer,
populates the destination IP equal to the Dual/Multi IMSI platform IP or the GGSN IP of MVNO/E (according to the implementation scenario) in the IP layer,
translates the APN from the sponsor to a home APN
virtualizes sequence number to maintain the state and return the create PDP context response towards the SGSN which invoked the create PDP context invoke message.

In a third embodiment, wherein the IMSI in the incoming PDP context message belongs to a subscriber of a sponsor network and the APN does not belong to the sponsor but to a corporate APN, the GTP filter routes the messages towards the GGSN of the sponsor network without modifications in the IP or GTP layer.

In a fourth embodiment the IMSI in the incoming PDP context message belongs to a subscriber of a Dual/Multi IMSI client or MVNO network and the APN does not belong to the sponsor but to a corporate APN, the GTP filter routes the messages towards the GGSN of the Dual/Multi IMSI client or MVNO network without modifications in the IP or GTP layer.

In a method of the invention one or more of the above embodiments may be incorporated, preferably at least the first two embodiments, and most preferably all four.

The system for APN correction in a roaming relationship where a sponsor operator network is used comprises a GTP filter arranged for performing the above mentioned steps in the method for APN correction.

In the method for conveying GTP (GPRS Tunnelling Protocol) messages between a serving GPRS support node (SGSN) and Dual/Multi IMSI platform in a roaming relationship for Dual/Multi IMSI scenario wherein a sponsor operator network is used a GTP filter is provided, being arranged for actuating call flow logic for routing the GTP traffic between the SGSN and the Dual IMSI platform to route the control plane traffic pertaining to GPRS GTP through the GTP filter, while the data plane traffic is routed directly between the serving GPRS support node and the Dual/Multi IMSI platform, without going through the GTP filter.

Manipulation by the filter at the GTP Control layer message (Create PDP Context) enables these effects.

In the method for conveying GTP (GPRS Tunnelling Protocol) messages between a serving GPRS support node (SGSN) and GGSN of a MVNO/E wherein the MVNO uses the IMSI of the sponsor, but has it own core network layer including GGSN, a GTP filter is provided, being arranged for actuating call flow logic for routing the GTP traffic between the SGSN and the GGSN of the MVNO/E to route only GTP-Control Create PDP Context through the GTP filter, while the other GTP-Control messages as well as data plane traffic is routed directly between the serving GPRS support node and the GGSN of the MVNO/E, without going through the GTP filter.

Manipulation by the filter at the GTP Control layer message (Create PDP Context) enables these effects.

The method for conveying preferably comprises the following steps:

when a DNS query from the serving GPRS support node to the sponsor operator network is initiated the DNS returns the IP address of the GTP Filter IP, and when a subsequent create PDP context from the serving GPRS support node arrives at the GTP filter, a check is performed by the GTP filter on IMSI and APN data in the GTP layer, wherein depending on the content of the IMSI and APN data in the GTP layer, the GTP filter modifies IP address (Source and destination) in the IP plane, but does not modify the SGSN address in the GTP-Control Create PDP Context invoke message Similarly in the GTP-Control Create PDP Context response message arriving from the Dual/Multi IMSI platform or the GGSN of MVNO/E (as per the implementation scenario), the GTP filter does not change the GGSN IP address in the GTP layer.

These method steps ensure in a simple way that

GTP-Control Create PDP Context traffic is routed through GTP Filter.

GTP-Control plane messages, other than the Create PDP Context and the data plane traffic is established directly between the SGSN (serving GPRS support node) and the GGSN (gateway GPRS support node) of the MVNO/E or a Dual/Multi IMSI platform as applicable.

Bypassing the GTP filter for the GTP-Control plane messages, other than the Create PDP Context and the data plane traffic implies that the operator ensures that the operator can offer the same quality of service and does not create any extra latency.

The features of the four embodiments described above for the method for APN correction also form features of preferred embodiments for the method and system for conveying.

In the first step of the method for routing logic, the Sponsor Operator in its DNS (Domain name system) reconfigures the IP address to be resolved against its own (Sponsor Operator) APNs to a GTP filter IP address. Hence, if there is a name server lookup for DNS query towards the Sponsor Operator DNS with the Sponsor Operator APN followed by the sponsor operator MNC/MCC (Mobile Network Code/Mobile Country Code), it will provide the IP address of the GTP filter. The GTP filter IP preferably from the range of the IPs reserved by the operator to represent the GSN (GPRS Support Node) IP PMN (Public Mobile network) BACKBONE. This IP should also be from the same GSN PMN BACKBONE IP pool included in the IR21 of the Sponsor Operator.

The entry for Corporate APNs (for instance Blackberry), remains unaltered at the DNS. It will resolve the Sponsor Operator GGSN (Gateway GPRS Support Node) against the DNS lookups initiated by the SGSNs.

Subsequently, when the SGSN (Serving GPRS Support Node) of the roaming partner invokes a Create_PDP_Context it is sent towards the GTP filter, which allows the GTP filter to analyse the different parameters, in particular IMSI and APN data to decide whether to route the message further to D-IMSI platform/GGSN of MVNO/E after actuating APN correction or towards the Sponsor Operator GGSN without modifying any parameter in the GTP layer.

While forwarding the message towards the Sponsor Operator GGSN or towards the D-IMSI platform, the GTP filter populates its own IP address as the origination IP address, and hence in effect forces the return message to pass through the GTP filter.

Therefore, a return message from the Sponsor Operator GGSN or the D-IMSI platform or the GGSN of the MVNO/E is sent back to the GTP Filter, and this provides the GTP filter the opportunity to manipulate the IP addresses in the IP layer before forwarding the Create PDP Context response back to the SGSN. As GTP is UDP, the Filter executes a swap/reverse of the values of the source and the destination IP in the response message towards the SGSN compared to the Invoke message. This ensure that the response message is not rejected by the SGSN due to disparity of IP addresses in the IP layer between the invoke and the response message In case of the call flow for GTP routing towards the Sponsor Operator GGSN, the GTP filter does a DNS query to find out the IP address of the Sponsor Operator GGSN (multiple IPs in load sharing).

In case of the call flow for GTP routing towards the Dual/Multi IMSI platform or the GGSN of the MVNO/E, no DNS query is initiated by the GTP filter. Instead these addresses are mapped in the platform and routed to the destination after applying the APN correction logic.

Additionally as a security mechanism and if supported by the Sponsor network, there can be an IP SLA (Service level Agreement) mechanism between the DNS and the GTP filter. The DNS pings a specific port of the GTP Filter to implement IP SLA mechanism. The ping can to at IP layer level or an application layer ping, like GTP echo request. By pinging a GTP filter IP and a particular port of the GTP filter, it checks the health. If GTP filter platform is down or the LAN port unreachable, the ping result is negative, the DNS dynamically replaces the IP address (against the sponsor operator APNs) from GTP filter IP address to its own GGSN IP address. This ensures that in the eventuality of operational issues at GTP filter, all traffic bypasses the GTP filter and the GPRS traffic for the sponsor network is not impacted.

After the PDP context is activated, the subsequent GTP-Control messages and the GTP-U (data plane) traffic are directly exchanged between the serving GPRS support node and the GGSN of the MVNO/E or the Dual/Multi IMSI platform or the GGSN of the SPONSOR NETWORK. This is because of the fact that the GTP filter does not alter the GSN IP addresses of the GTP layer and the real SGSN and GGSN/D-IMSI platform IP addresses are retained.

The methods and systems of the invention provide a unique solution which is completely agnostic to the behaviour of the handset. Because it is agnostic on the behaviour of the handset the method and system of the invention works with all categories of mobile devices, all mobile networks and all categories of subscribers (prepaid/postpaid).

The invention provides one more of advantages:

The invention makes it possible to perform data roaming without any change or dependence or customisations on the handsets or mobile networks. The Dual/IMSI customer does not have to do any major network changes to implement the GTP filter solution, and hence there is no impact on the CAPEX (capital expenditure). The invention works for both prepaid (non Camel) and postpaid subscribers.

The methods and systems provides for a new roaming application called GTP filter which implements a network algorithm which enables data roaming for all handsets/tablets roaming on Dual/Multi IMSI solution. The solution intercepts the GTP flow between the GSNs (in a Sponsored network scenario), manipulates the GTP parameters, and actuates a unique signalling flow between the associated network elements so that the GTP traffic is routed to the home network following APN correction.

The method and system of the invention manipulates a specific message of the GTP control traffic for packet data context activation. It does not engage itself in the flow of the other GTP control messages and the GTP User pane messages (data traffic). Hence the method and system of the invention does not impact the QOS in any way.

In preferred embodiments, the GTP filter stays out of the data traffic leg. Hence it makes the solution Lite and saves power/energy and processing load making the solution more green and eco friendly.

The solution is based on manipulation of the existing GTP parameters. The method and system of the invention does not necessitate a change to the 3GPP standards framework for GPRS to coin/propose any new GTP parameter to process the service logic. To be more precise, the GPRS parameters are the same, but their values are changed in an intelligent way to facilitate the service logic. The solution can be implemented by any GRX or Dual/Multi IMSI provider or even within the core network of the mobile operator.

BRIEF DESCRIPTION OF THE DRAWINGS

These and further aspects of the invention will be explained in greater detail by way of example and with reference to the accompanying drawings, in which.

The figures are not drawn to scale. Generally, identical components are denoted by the same reference numerals in the figures.

DETAILED DESCRIPTION OF PREFERRED EMBODIMENTS

Figure 1:
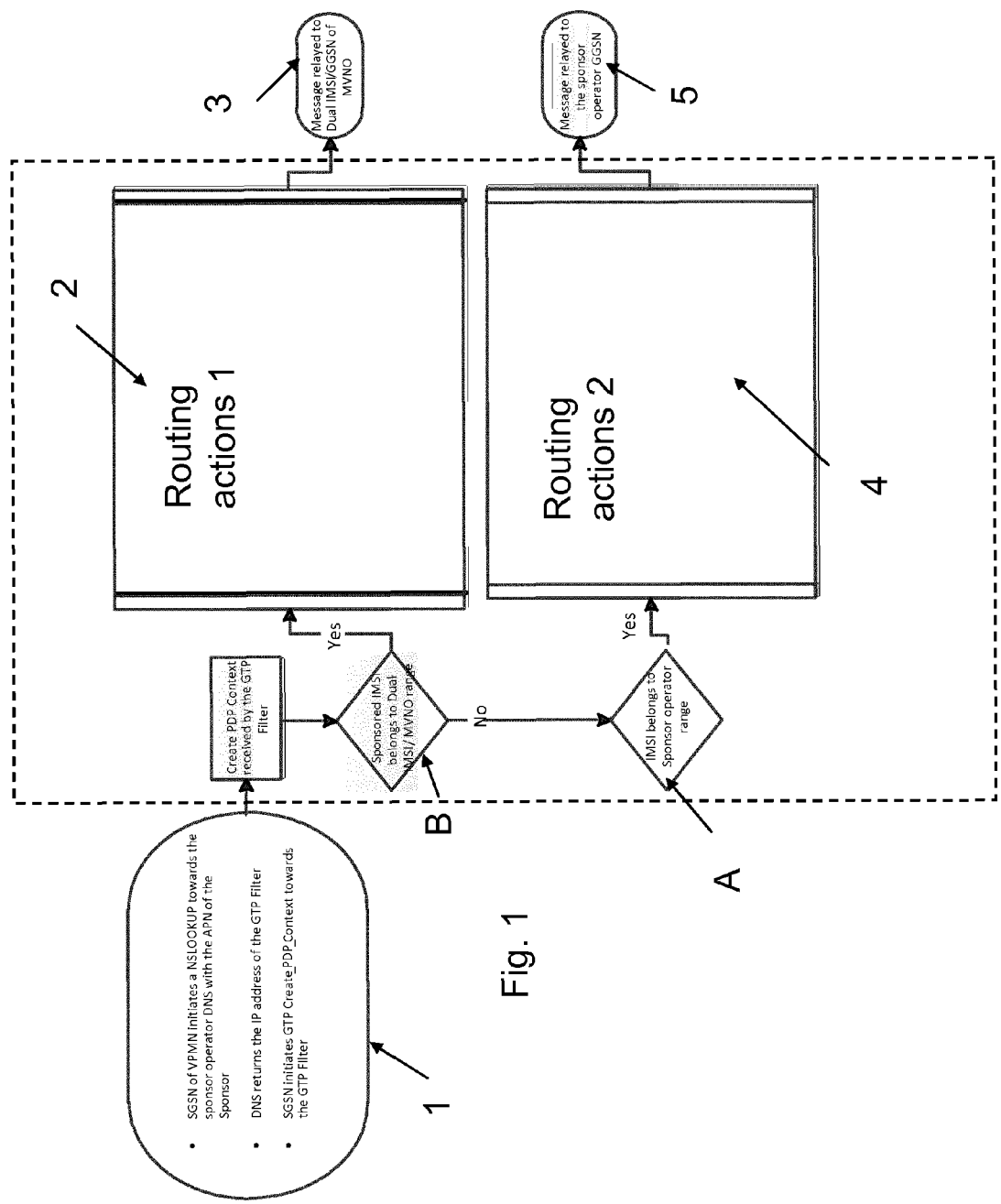
FIG. 1 illustrates an algorithm followed in a GTP filter and method according to the invention

FIG. 1 provides an illustration of the algorithm followed at the GTP filter. The GTP filter is schematically indicated by the rectangle in dotted lines.

Step 1 in the oval indicates that the Sponsor Operator reconfigures in the DNS the IP address for its own (Sponsor Operator) APNs to GTP filter IP address. Hence if there is an nslookup towards the Sponsor Operator DNS with the Sponsor Operator MNC/MCC, it will resolve the IP address of GTP filter. The GTP filter IP will be assigned from the GSN IP PLMN backbone pool already included in the IR21 of Sponsor Operator. The Corporate and Blackberry APNs will however still be routed to Sponsor Operator GGSN.

The GTP-C Create PDP Context will then arrive at the GTP filter. The GTP filter does a check on 2 parameters in the GTP layer of the message. They are:
IMSI & APN

TABLE 1

| Item | Processing Create PDP Context message | Action |
|---|---|---|
| A | IMSI in the incoming Create PDP Context message belongs to subscriber of sponsor network (identified by the MCC + MNC of the IMSI parameter) APN = Sponsor | No correction of the SGSN address in GTP layer Populate Destination IP equal to GGSN IP of the sponsor network in IP layer. No modification of APN To virtualize Sequence number to maintain the state and to be able to return the Create PDP Context response towards the correct SGSN (which invoked the Create PDP Context Message) |
| B | IMSI in the incoming Create PDP Context message belongs to subscriber of Dual/Multi IMSI client/ | No modification of the SGSN address in GTP layer Populate Destination IP equal to D-IMSI platform IP/MVNO GGSN IP in IP layer. |

TABLE 1-continued

| Item | Processing Create PDP Context message | Action (conditional/optional) |
|---|---|---|
| | MVNO network. It is identified analysing the IMSI: MCC + MNC + Operator identifier in the MSIN parameter) APN = Sponsor | Translate APN from Sponsor to Home APN according to the APN mapping table in next paragraph To virtualize Sequence Number to maintain the state and to be able to return the Create PDP Context response towards the correct SGSN (which invoked the Create PDP Context Message) |
| C | IMSI belongs to subscriber of sponsor network (identified by the MCC + MNC of the IMSI parameter) APN = Not belonging to Sponsor, but maybe corporate APNs or Blackberry APNs | route the messages towards the GGSN of the sponsor network without any modifications in the IP or the GTP layer |
| D | IMSI belongs to subscriber of Dual/Multi IMSI network or MVNO. It is identified analysing the IMSI: MCC + MNC + Operator identifier in the MSIN parameter) APN = Not belonging to Sponsor, but maybe corporate APNs or Blackberry APNs | Routes the messages towards the Multi/Dual IMSI platform/ MVNO GGSN without any modifications in the IP or the GTP layer |

In FIG. 1 the items A and B are indicated.

Depending on which item is found a set of routing actions is performed in steps 2 and 4. Examples of such actions are:

Routings Actions 1:
  Change APN from Sponsor to Home as per APN mapping table
  Set source IP to GTP IP address in the Create PDP Context message relayed to Dual/Multi IMSI/GGSN of MVNO
  No change in the IP addresses in the GTP layer/TEID in the Create PDP Context relay message.
  Set destination IP to Dual/Multi IMSI platform/GGSN of MVNO in the Create PDP Context relay message.
  Generate sequence number and maintain that sequence number to correlate the transaction later (during processing the in the Create PDP Context return result from Dual/Multi IMSI or the GGSN of the MVNO/E).
  When the return message is received correlate the transaction by correlation the sequence number (incoming and outgoing message). Then the GTP filter finds the SGSN where the result should be routed to.
  The correlation of the transaction is actuated by checking the mapping of the sequence number originally received from SGSN in the invoke Create PDP Context with what was generated by the GTP Filter to route the create PDP context to the Dual/Multi IMSI/GGSN of MVNO Routing Actions 2:
  Retain the APN
  Set source IP to GTP IP address in the create PDP context message relayed to Sponsor Operator GGSN
  Find out the GGSN IP of the Sponsor Operator by invoking a NSLOOKUP towards the DNS of the sponsor operator.
  Subsequently relay the create PDP Context to the GGSN of the Sponsor operator No change in the IP addresses in the GTP layer/TEID in the relay message Set destination IP to Dual/Multi IMSI platform/GGSN of MVNO Generate sequence number and maintain that sequence number to correlate the transaction later (during processing the return result).

No change in the IP at the GTP layer of the invoke message

When the return message is received correlate the transaction by correlation the sequence number (incoming and outgoing message). Then the GTP filter finds the SGSN where the result should be routed to The correlation of the transaction is actuated by checking the mapping of the sequence number originally received from SGSN in the invoke Create PDP Context with what was generated by the GTP Filter to route the create PDP context to the Sponsor GGSN Steps 3 and 5 in FIG. 1 indicate where the message are relayed to respectively to the Dual or Multi IMSI (step 3) or the GGSN of the MVNO (step 5). The GTP filter is schematically indicated by the rectangle with broken lines. Dual/Multi IMSI platform can be a dual as well as a multi IMSI platform. The use of the word 'Dual/Multi' is not a restriction to either of the two possibilities for an IMSI platform, multi can be any number greater than two.

The GTP filter preferably has an APN mapping table which will hold one to one APN mapping data between the APN in the incoming Create PDP Context (belonging to sponsor operator) and the APN in outgoing Create PDP Context (belonging to Dual/Multi IMSI operator/MVNO).

As an example:

Say sponsor operator APN (as chosen by the smartphone when the sponsor IMSI is selected for network latch up)=>wap.sponsoroperator.net Say to Dual/Multi IMSI operator/MVNO APN=>wap.homenetwork.net So when the GTP filter receives a Create PDP Context message from SGSN with the APN=wap.sponsoroperator.net and finds that the sponsor IMSI belongs to Dual/Multi IMSI operator/MVNO, then it will translate the APN to wap.homenetwork.net in the message that the GTP Filter relays to the Dual/Multi IMSI platform or MVNO GGSN (as applicable).

The further processing according to the service logic is for instance as follows:

Any Echo request messages arriving from the GTP Filter is responded back with the IP address of the GTP filter (as the source). Echo request messages arriving from the SGSN are not be forwarded to GSN or Dual/Multi IMSI. Echo request messages are be directly exchanged between the SGSN and the GGSN or the Dual/Multi IMSI platform.

While forwarding the message towards the Sponsor Operator GGSN or towards the Dual/Multi IMSI platform/GGSN of the MVNO/E, the GTP filter populates its own IP address as the origination IP address, and hence in effect forces the return message to pass through the GTP filter.

The return message from Sponsor Operator GGSN or the Dual/Multi IMSI platform needs to come back to the GTP Filter, because the GTP filter has to manipulate the IP addresses (as in the call flow) in the IP layer before forwarding the Create PDP Context response back to the SGSN.

As GTP is UDP, the source and the destination IP in the response message in the response message towards the SGSN has to be a swap of the values as in the Invoke message. Hence the GTP filter has to actuate the manipulation in the Create PDP Context response message relayed by the GTP Filter to the destination by populating the GTP filter IP in the Source IP field.

Figure 2:
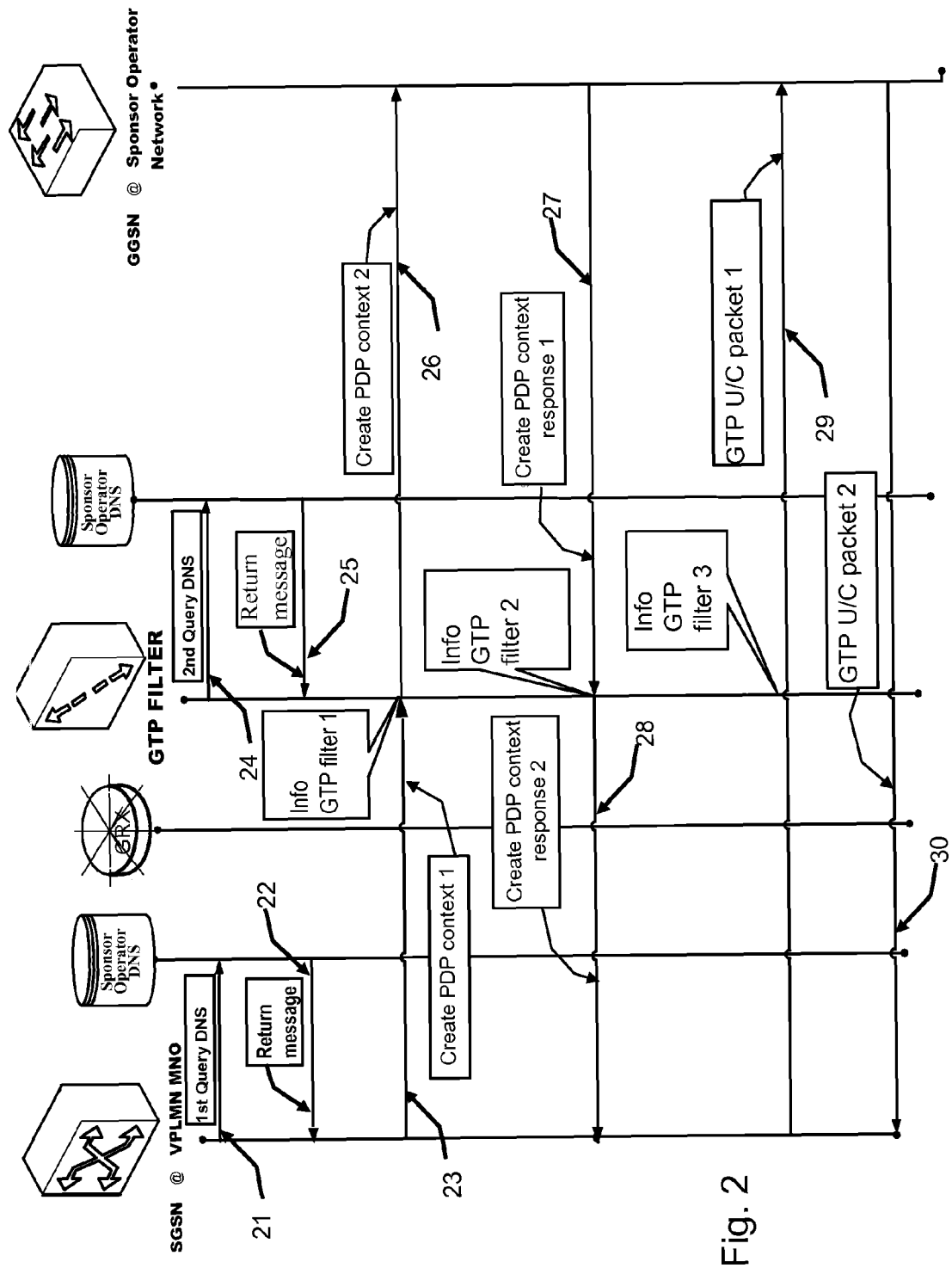
FIG. 2 illustrates data flow for a first embodiment of a method and system of the invention.
Figure 3:
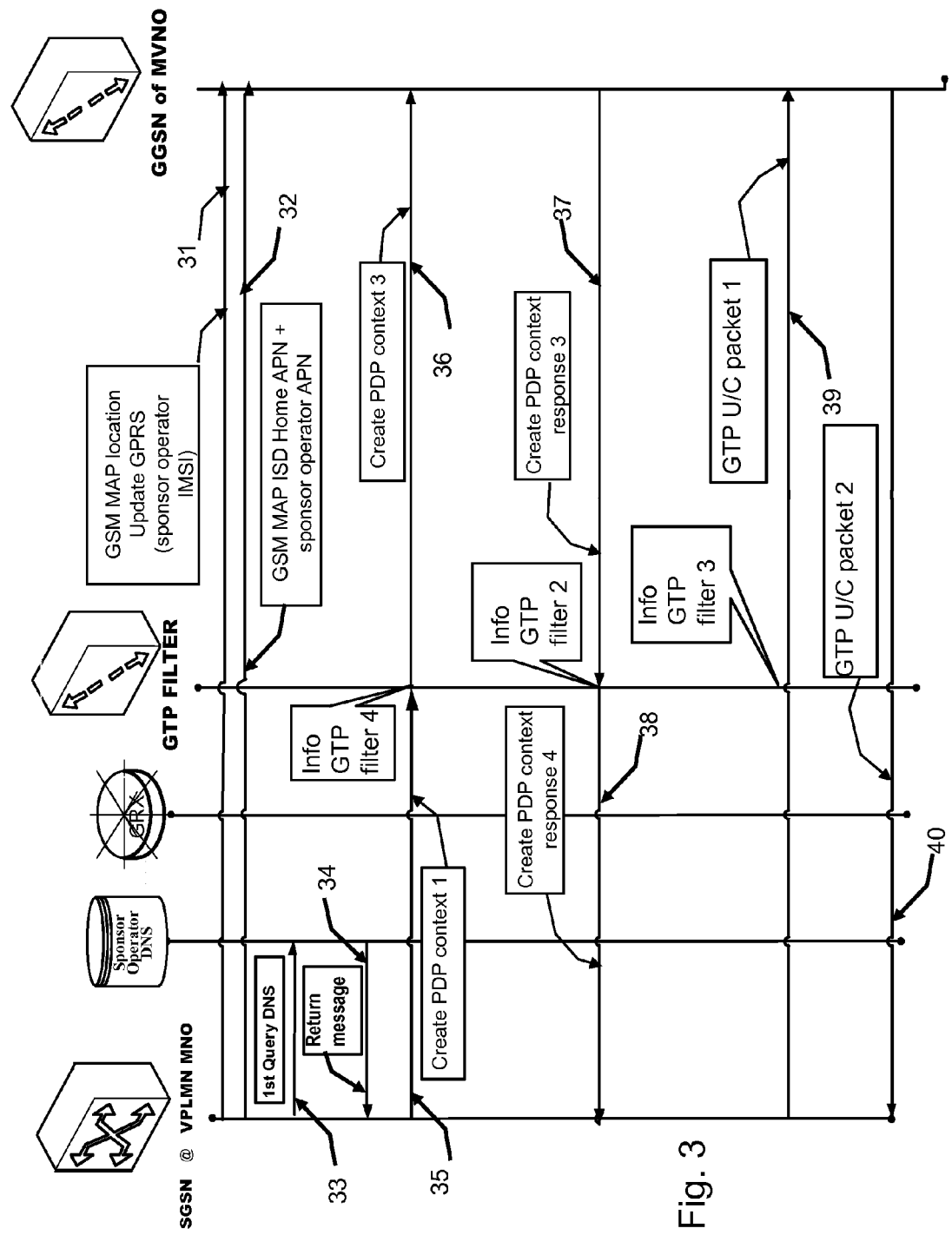
FIG. 3 illustrates data flow for a second embodiment of a method and system of the invention
Figure 4:
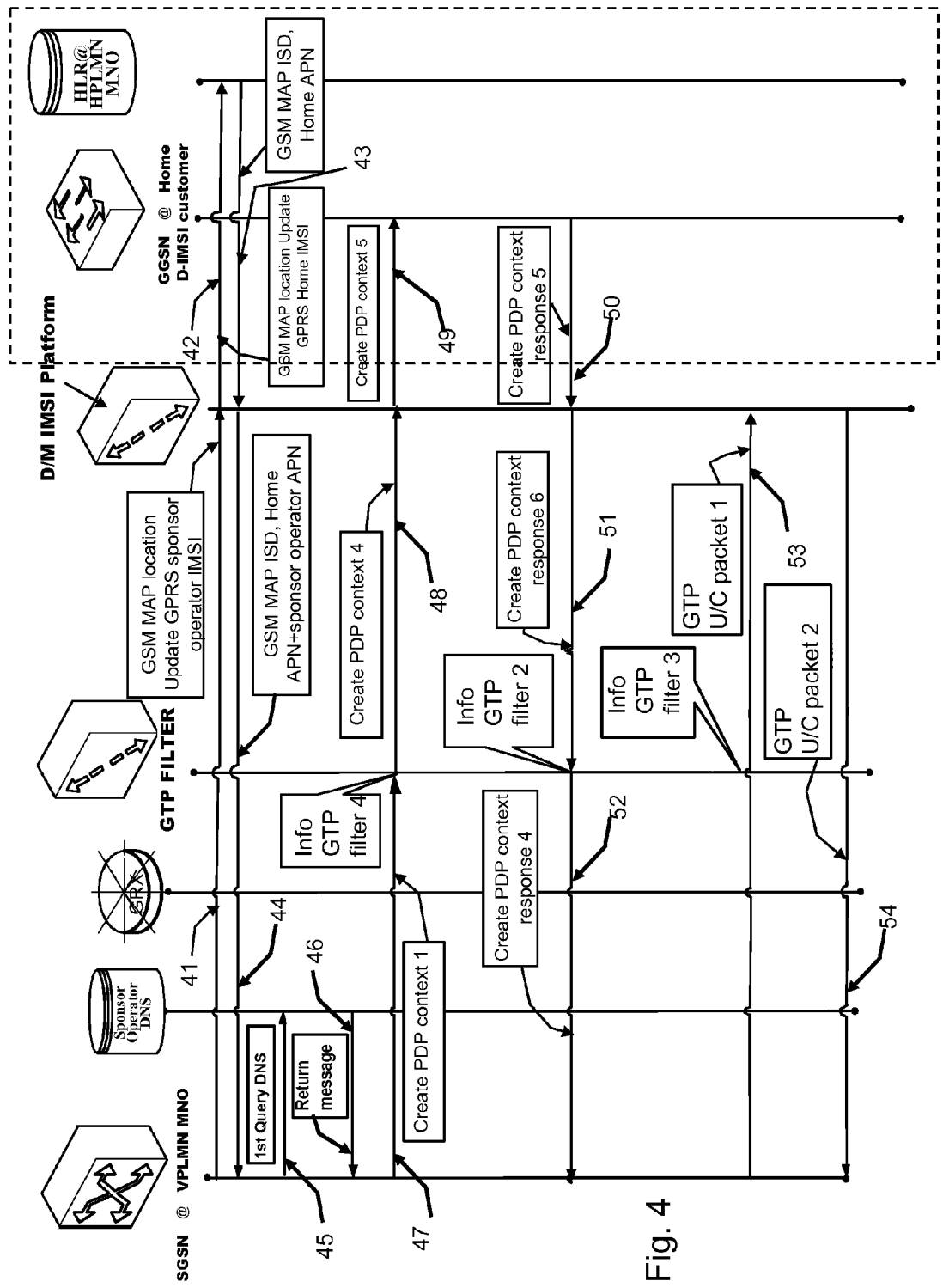
FIG. 4 illustrates data flow for a further embodiment of a method and system of the invention.

FIGS. 2 to 4 illustrate various call flows for message routing.

In FIGS. 2, 3 and 4 in various text balloons information is provided.

For ease of readability the various informations and call flows are indicated in text balloons with short hand description "Info GTP filter 1", "Info create PDP context1", etc.

Examples of such information and call flows are given below.

FIG. 2 illustrates the message routing towards Sponsor Operator GGSN.

The method starts with a query DNS towards the sponsor operator DNS (step 21).

The Sponsor Operator reconfigures in the DNS the IP address for its own (Sponsor Operator) APNs to GTP filter IP address In the return message (step 22) this information is provided.

The GTP-C Create PDP Context will then arrive at the GTP filter (step 23).

An example of such a context would be:

"Create PDP context 1" in the figure is a short hand indication for a call flow of for instance the following:
Create PDP context
Source IP=SGSN IP
Destination IP=GTP Filter (public)
GTP Header
SGSN IP for C=real
SGSN for U=real
TEID for GGSN(C)=generated by SGSN
TEID for GGSN(C)=generated by SGSN
IMSI=Sponsor Operator
APN=wap.SponsorOperator.net
Sequence number=n1

The next step is schematically indicated in the figure by "Info Filter 1": The GTP filter checks the IMSI and APN data. In this case the GTP filter analyses the IMSI to find that it belongs to the sponsor operator as the MSIN part of the IMSI does not carry the network identifier (usually 2 to 6 digits) of the Dual/Multiple IMSI network or the MVNO/E. Hence the GTP filter routes the message to GGSN of the sponsor network without any changes, this amounts to item A in the above table (table 1).

Before routing the message to the GGSN of the sponsor operator, the GTP filter needs to find out the GGSN of the sponsor operator. Hence, the GTP filter sends a second Query DNS to the Sponsor Operator DNS (step 24). The Sponsor Operator DNS returns to the GTP filter the Sponsor Operator GGSN IP address (step 25).

Subsequently, the GTP filter relays the create PDP context message to the GGSN@ Sponsor operator network (step 26) "Create PDP Context 2":
Create PDP context
Source IP=GTP Filter
Destination IP=GGSN Sponsor Operator
GTP Header
SGSN IP for C=real
SGSN for U=real
TEID for GGSN(C)=generated by SGSN
TEID for GGSN(U)=generated by SGSN
IMSI=Sponsor Operator
APN=wap.SponsorOperator.net
Sequence number=k1

The GTP filter receives a PDP context response from the GGSN of the Sponsor Operator Network (step 27):

"create PDP context response 1":
  Create PDP context response
  Source IP=GGSN Sponsor Operator
  Destination IP=GTP filter
  GTP Header
  GGSN IP for C=real IP
  GGSN for U=real IP
  TEID for SGSN(C)=generated by GGSN
  TEID for SGSN(U)=generated by GGSN
  Sequence number=k1

The GTP filter (steps schematically indicated in the figure by "info GTP filter 2") modifies the source IP and the destination IP to retain IP layer parity with the invoke message. The GTP filter uses the sequence number to correlate the transaction and find out the SGSN which invoked the Create PDP Context Message and sends a Create PDP Context response towards the SGSN (step 28)

"create PDP context response 2":
  Create PDP context response
  Source IP=GTP Filter
  Destination IP=SGSN VPMN
  GTP Header
  GGSN IP for C=real IP
  GGSN for U=real IP
  TEID for SGSN(C)=generated by GGSN
  TEID for SGSN(U)=generated by GGSN
  Sequence number=n1

The subsequent GTP-C & U message (steps 29 and 30) do not pass through the GTP filter (Info filter 3), but are exchanged directly between the SSGN of VPLMN MNO and the GGSN of the Sponsor Operator network.

"GTP U/C packet 1"
  GTP U/C packet
  Source IP=SGSN
  Destination IP=GGSN
  GTP header
  TEID=real "GTP U/C packet 2"
  GTP U/C packet
  Source IP=GGSN
  Destination IP=SGSN
  GTP header
  TEID=real FIG. 3 illustrates call flow for message routing towards a GGSN of an MVNO.

The first two steps (steps 31 to 32) are GPRS location map exchanges between the SGSN at VPLMN MNO and the GGSN of the MVNO. The HLR of the MVNO needs to be provisioned with either (*) wildcard or the Sponsor Operator APNs in the subscriber profile. During the GPRS location update process the HLR downloads the (*) wildcard or the Sponsor Operator APNs in the VLR profile of the user.

Steps 33 and 34 correspond to steps 21 and 22 in FIG. 2.
Create PDP Context 1
Source IP=SGSN VPMN
Destination IP=GTP Filter (Public)
GTP Header
SGSN IP for C=Real
SGSN IP for U=Real
TEID for GGSN(C)=generated by SGSN
TEID for GGSN (U)=generate d by SGSN
IMSI=Sponsor Operator
APN=wap.Sponsor operator.net
Sequence number=n1

The GTP Filter will reroute the Create PDP Context Invoke to GGSN of the MVNO/E after carrying out APN correction to Home APN in the outgoing message. It also changes the sequence number and maintains the state (Info GTP Filter 4).
Create PDP Context 3
Source IP=GTP Filter
Destination IP=GGSN of MVNO
GTP Header
SGSN IP for C=Real
SGSN IP for U=Real
TEID for GGSN (C)=generated by SGSN
TEID for GGSN (U)=generated by SGSN
IMSI=Sponsor Operator
APN=wap.Home Network.net
Sequence number=k1

Steps 37 and 38 correspond to steps 27 and 28 in FIG. 2, except that the GGSN of the MVNO send the Create PDP context response to the GTP filter:

"create PDP context response 3":
  Create PDP context response
  Source IP=GGSN of MVNO
  Destination IP=GTP filter
  GTP Header
  GGSN IP for C=hub
  GGSN for U=hub
  TEID for SGSN(C)=hub
  TEID for SGSN(U)=hub
  Sequence number=k1

"create PDP context response 4":
  Create PDP context response
  Source IP=GTP Filter
  Destination IP=SGSN VPMN
  GTP Header
  GGSN IP for C=hub
  GGSN for U=hub
  TEID for SGSN(C)=hub
  TEID for SGSN(U)=hub
  Sequence number=n1

Steps 39 and 40 correspond to steps 29 and 30 except for the fact that at the right hand side the GGSN of the MVNO is situated in FIG. 3, where the GGSN of the Sponsor Operator network was situated in FIG. 2.

FIG. 4 illustrates call flow for message routing towards Dual/Multi IMSI

At the right hand side a section is provided between dotted lines. This section of the call flow illustrates conventional Dual/Multi IMSI platform behaviour and has been provided for the sake of completeness of the call flow. Also steps 41 to 44 are part of the conventional call flow for a Dual/Multi IMSI Platform.

Steps 45, 46 and 47 correspond to steps 21, 22 and 23 of FIG. 2. Steps 52 corresponds to step 28 of FIG. 2; steps 48, 51, 53 and 54 in FIG. 4 correspond to steps 26, 27, 29 and 30 of FIG. 2, except for the fact that at the right hand side the Dual/Multi IMSI platform is situated in FIG. 4, where the GGSN of the Sponsor Operator network was situated in FIG. 2.

This also leads to changes in the various "Create PDP context" and "Create PDP context response" which are given below, where the create PDP context for the part between the various parts are for instance:

"Create PDP context 4":
SourceIP=GTP Filter IP1/IP2
Destination IP=Dual/Multi IMSI PLATFORM
GTP Header
SGSN IP for C=Real
SGSN IP for U=Real
TEID for GGSN (C)=generated by SGSN
TEID for GGSN (U)=generated by SGSN IMSI=Sponsor Operator
APN=wap.Home Network.net
"Create PDP context 5":
Source IP=Dual/Multi IMSI PLATFORM
Destination IP=Home GGSN
GTP Header
SGSN IP for C=hub
SGSN IP for U=hub
TEID for GGSN (C)=hub
TEID for GGSN (U)=hub
IMSI=Home IMSI
APN=wap.Home Network.net
"create PDP context response 5":
   Create PDP context response
   Source IP=Home GGSN
   Destination IP=Dual/Multi IMSI Platform
   GTP Header
   GGSN IP for C=GGSN IP
   GGSN for U=GGSN IP
   TEID for SGSN(C)=generated by GGSN
   TEID for SGSN(U)=generated by GGSN
"create PDP context response 6":
   Create PDP context response
   Source IP=Dual/Multi IMSI platform
   Destination IP=GTP Filter
   GTP Header
   GGSN IP for C=hub
   GGSN for U=hub
   TEID for SGSN(C)=hub
   TEID for SGSN(U)=hub Of course, the source and the destination IP can also be directly read from the figures, and for a person skilled in the art the various headers are no surprise. For completeness sake the information is given above.

In all of the various examples the Automatic APN problem due to auto configuration of the APNs based on the IMSI and then rerouting the GTP messages to the appropriate destination has been solved in a relatively simple manner.

In short the invention can be described by:

In a method and system for APN (Access Point Name) modification/correction in a roaming scenario based on Dual/Multi IMSI service where a sponsor operator network is used and a method and system for re-routing GTP messages to the appropriate destination, i.e., the home network.

In a method and system for APN (Access Point Name) modification/correction in a roaming and non roaming scenarios for GPRS service offered by MVNO/E where a sponsor operator network is used and a method and system for re-routing GTP messages to the appropriate destination, i.e., the home network.

The GTP filter checks the IMSI and APN data in the GTP layer and, depending on the IMSI and APN data manipulates GTP parameters in the GTP Control plane to ensure APN correction routing of message to the appropriate destination. This solution allows enables data roaming from devices like smartphones in specific scenarios alike Dual/multi IMSI Roaming or GPRS data roaming offered by MVNO/E using the IMSI of a sponsor network, but have implemented their own GPRS core network.

Preferably for some configurations primarily for parameters arriving in the GTP-U (Data plane) traffic which does not pass through the GTP filter modifications are performed. These configurations are listed below.

Configurations Preferred at Dual/Multi IMSI/MVNO-E Network

1. Provisioning in the HLR: The customer provides a wildcard (*) or the Sponsor Network APNs in their HLR in the subscriber profile.
2. The Dual/Multi-IMSI customer/MVNO/E receives the home APN in their GGSN, so the above APNs need not be provisioned in the GGSN of Dual/Multi IMSI customer.
3. The mapping (configuration) between Sponsor network APNs and the Dual/Multi IMSI customer APN is validated and approved by the Dual/Multi IMSI customer.
4. Username/Password: the GTP-U traffic still will have SPONSOR NETWORK username and password. Generally the operators have a default 'do not care' set for this parameter. But in case this parameter is important for an operator, then they also need to accept the SPONSOR NETWORK Username/password as well. This is a definition generally done in the radius.
5. Proxy address: The proxy address in the GTP-U as automatically chosen by the smart phone will be the SPONSOR NETWORK Proxy. So Proxy redirection to Dual/Multi IMSI customer Proxy is preferably done.

Homepage (Internet/MMS/WAP):
   This will be the SPONSOR NETWORK Homepage chosen automatically by the device. So home page redirection is preferably done by the Home network.
   The invention is not restricted to the given exemplary embodiments.
   In the claims, any reference signs placed between parentheses shall not be construed as limiting the claim.
   The word "comprising" does not exclude the presence of other elements or steps than those listed in a claim. The invention may be implemented by any combination of features of various different preferred embodiments as described above.
   It could be a part of a system also used for other purposes such as communication, or attached to, integrated in or cooperating with such a communication device.
   Means for performing a step in the method can be in the form of hard-ware, soft-ware or any combination thereof. In the systems and devices according to the various embodiments of the inventions means are provided for performing the steps of the method. Where in the description or claims "means for" or similar words or words such as GTP filter are mentioned followed by more than one of the steps of the methods, said means however expressed in words can be a combined means for performing all of the steps, or a short hand notation for a number of means, each of said means for performing one or more of the steps of the method. When a number of steps are performed they need not be taken by a single means, and not be taken at the same location.
   Although throughout the text for each acronym the full name is given below a list of acronyms and their full name is given:

| acronym | full name |
| --- | --- |
| APN | Access Point Name |
| 3GPP | 3rd Generation Partnership Project |
| CAMEL | Customized Applications for Mobile network Enhanced Logic |
| CAPEX | capital expenditure |
| DNS | Domain Name System |
| GGSN | Gateway GPRS Support Node |
| GPRS | General Packet Radio Services |
| GRX | GPRS Roaming Exchange |
| GSM | Global System for Mobile Communications |
| GSN | GPRS Support Node |

-continued

| acronym | full name |
| --- | --- |
| GTP | GPRS Tunneling Protocol |
| HLR | Home Location Register |
| HPMN | Home Public Mobile Network |
| IMSI | International Mobile Subscriber Identity |
| INAP | Intelligent Network Application Protocol |
| IP | Internet Protocol |
| LAN | Local Area Network |
| LTE | Long term evolution |
| MCC | Mobile Country Code |
| MNC | Mobile Network Code |
| MNO | Mobile Network Operator |
| MVNE | Mobile Virtual Network Enabler |
| MVNO | Mobile virtual network operator |
| OS | Operating system |
| PDP | Policy Decision Point |
| PLMN | public land mobile network |
| PMN | Public Mobile network |
| QOS | Quality of Service |
| SCP | Service Control Point |
| SGSN | serving GPRS support node |
| SIM | Subscriber Identity Module |
| SLA | Service level Agreement |
| SMS | Short Message Service |
| TEID | The Tunnel Endpoint ID |
| UDP | User Datagram Protocol |
| UMTS | Universal Mobile Telecommunications Service |
| VLR | visitor location register |
| VPLMN | Visited Public land Mobile network |
| VPMN | Visited Public Mobile network |
| wap | Wireless Application Protocol |

The invention claimed is:

1. A method for Access Point Name (APN) correction in a roaming relationship where a sponsor operator network is used, wherein a General Packet Radio Services (GPRS) Tunnelling Protocol (GTP) filter is provided, wherein the method comprises:
 in response to a create Policy Decision Point (PDP) context from a serving GPRS support node arriving at the GTP filter, performing a check by the GTP filter on International Mobile Subscriber identity (IMSI) and APN data in a GTP layer, and
  depending on the content of the IMSI and APN data in the GTP layer, modifying by the GTP filter GTP parameters in a GTP control plane for
   routing the control plane traffic to a correct destination following an APN correction, wherein
   the data plane traffic is established directly between the serving GPRS support node and a gateway GPRS support node GGSN or a Dual/Multi IMSI platform.

2. Method as claimed in claim 1, wherein the GTP filter modifies GTP parameters in the GTP Control plane for
 APN correction as applicable
 routing the GTP control plane Create PDP Context traffic to the following destinations:
  route to a Sponsor Network GGSN if IMSI in the Create PDP Context belongs to a subscriber of sponsor network
  route to the Dual/Multi IMSI platform if IMSI in the Create PDP Context belongs to a subscriber Dual/Multi IMSI
  route to a GGSN of a Mobile virtual network operator/enabler (MVNO/E) if IMSI in the Create PDP Context belongs to a MVNO/E
 wherein the data plane traffic is established directly between the serving GPRS support node and a gateway GPRS support node or a Dual/Multi IMSI platform.

3. Method as claimed in claim 1 wherein the GTP filter is provided in a GRX carrier.

4. Method as claimed in claim 1, wherein the IMSI in the incoming PDP context message belongs to a subscriber of a sponsor network and the APN belongs to the sponsor, the GTP filter performs no correction of the SGSN address in the GTP layer nor of the APN, populates the destination IP equal to the GGSN IP of the sponsor network in the IP layer and virtualizes sequence number to maintain the state and return the create PDP context response towards the SGSN which invoked the create PDP context message.

5. Method as claimed in claim 1, wherein the IMSI in the incoming PDP context message belongs to a subscriber of a Dual/Multi IMSI client or MVNO network and the APN belongs to the sponsor, the GTP filter performs no correction of the SGSN address in the GTP layer, populates the destination IP equal to the GGSN IP of the Dual/Multi IMSI platform IP or the MVNO IP in the IP layer, translates the APN from the sponsor to a home APN and virtualizes sequence number to maintain the state and return the create PDP context response towards the SGSN which invoked the create PDP context message.

6. Method as claimed in claim 1, wherein the IMSI in the incoming PDP context message belongs to a subscriber of a sponsor network and the APN does not belong to the sponsor but to a corporate APN, and the GTP filter routes the messages towards the GGSN of the sponsor network without corrections in the IP or GTP layer.

7. Method as claimed in claim 1 wherein the IMSI in the incoming PDP context message belongs to a subscriber of a Dual/Multi IMSI client or MVNO network and the APN does not belong to the sponsor but to a corporate APN, the GTP filter routes the messages towards the GGSN of the Dual/Multi IMSI client or MVNO network without corrections in the IP or GTP layer.

8. Method for conveying General Packet Radio Services (GPRS) Tunnelling Protocol (GTP) messages to and from a serving GPRS support node in a roaming relationship wherein a sponsor operator network is used, wherein
 a GTP filter is provided between
 the serving GPRS support node and a gateway GPRS support node or between
 the serving GPRS support node and a Dual/Multi IMSI platform, the method comprising:
 actuating, by the GTP filter, call flow logic for routing the GPRS traffic to the serving GPRS support node, and
 routing the GTP control plane traffic through the GTP filter, wherein the data plane traffic is routed directly between a first and a second GPRS node or between the serving GPRS support node and the Dual/Multi IMSI platform, without going through the GTP filter.

9. Method as claimed in claim 8, wherein the GTP filter is provided between the serving GPRS support node and a gateway GPRS support node.

10. Method as claimed in claim 9 for conveying GTP messages between the serving GPRS support node and a GGSN of a Mobile virtual network operator/enabler (MVNO/E) wherein the MVNO/E uses the IMSI of the sponsor, but has its own core network layer including GGSN, wherein the GTP filter is arranged:
 for actuating call flow logic for routing the GTP traffic between the SGSN and the GGSN of the MVNO/E
 to route only GTP-Control Create Policy Decision Point (PDP) Context through the GTP filter, while other GTP-Control messages as well as data plane traffic is routed directly between the serving GPRS support node and the GGSN of the MVNO/E, without going through the GTP filter.

11. Method as claimed in claim 10 wherein
when a DNS query from the serving GPRS support node to the sponsor operator network is initiated the DNS returns the IP address of the GTP Filter IP
and when a subsequent create PDP context from the serving GPRS support node arrives at the GTP filter, a check is performed by the GTP filter on IMSI and APN data in the GTP layer, wherein
depending on the content of the IMSI and APN data in the GTP layer, the GTP filter modifies an IP address in the IP plane, but does not modify the SGSN address in the GTP-Control Create PDP Context invoke message and
Similarly in the GTP-Control Create PDP Context response message arriving from the Dual/Multi IMSI platform or the GGSN of MVNO/E, the GTP filter does not change the GGSN IP address in the GTP layer.

12. Method as claimed in claim 8, wherein the GTP filter is provided between the serving GPRS support node and a Dual/Multi IMSI platform.

13. Method as claimed in claim 12, wherein for conveying GTP messages between the serving GPRS support node and Dual/Multi IMSI platform the GTP filter is arranged
for actuating call flow logic for routing the GTP traffic between the SGSN and the Dual/Multi IMSI platform
to route the control plane traffic, pertaining to GPRS GTP through the GTP filter, while the data plane traffic is routed directly between the serving GPRS support node and the Dual/Multi IMSI platform, without going through the GTP filter.

14. Method as claimed in claim 13 wherein
when a DNS query from the serving GPRS support node to the sponsor operator network is initiated the DNS returns the IP address of the GTP Filter IP
and when a subsequent create PDP context from the serving GPRS support node arrives at the GTP filter, a check is performed by the GTP filter on IMSI and APN data in the GTP layer, wherein
depending on the content of the IMSI and APN data in the GTP layer, the GTP filter modifies an IP address in the IP plane, but does not modify the SGSN address in the GTP-Control Create PDP Context invoke message and
Similarly in the GTP-Control Create PDP Context response message arriving from the Dual/Multi IMSI platform or the GGSN of MVNO/E, the GTP filter does not change the GGSN IP address in the GTP layer.

15. System for APN (Access Point Name) correction in a roaming relationship where a sponsor operator network is used wherein the system comprises a General Packet Radio Services (GPRS) Tunnelling Protocol (GTP) filter, the filter being arranged to, when a create Policy Decision Point (PDP) context from a serving GPRS support node arrives at the GTP filter, perform a check on International Mobile Subscriber identity (IMSI) and APN data in a GTP layer, and depending on the content of the IMSI and APN data in the GTP layer, to modify GTP parameters in a GTP Control plane for
a. routing control plane traffic pertaining to GPRS GTP through the GTP filter wherein
b. the data plane traffic is established directly between the serving GPRS support node and a gateway GPRS support node or a Dual/Multi IMSI platform.

16. System for conveying General Packet Radio Services (GPRS) Tunnelling Protocol (GTP) messages to and from a serving GPRS support node (SGSN) in a roaming relationship wherein a sponsor operator network is used, wherein
the system comprises a GTP filter provided between
the serving GPRS support node and a gateway GPRS support node or between
the serving GPRS support node and a Dual/Multi IMSI platform, wherein the GTP filter is arranged
for actuating call flow logic for routing GPRS traffic to the serving GPRS support node, and
to route control plane traffic pertaining to GPRS GTP through the GTP filter, wherein the data plane traffic is routed directly between a first and a second GPRS node or between the serving GPRS support node and the Dual/Multi IMSI platform, without going through the GTP filter.

17. System as claimed in claim 16, wherein
the system is arranged for performing the following steps:
when a first query DNS from the serving GPRS support node to the sponsor operator network is initiated an IP address for the sponsor operator is reconfigured by the Sponsor Operator to a GTP Filter IP address, and
when a subsequent create Policy Decision Point (PDP) context from the serving GPRS support node arrives at the GTP filter, a check is performed by the GTP filter on International Mobile Subscriber identity (IMSI) and Access Point Name (APN) data in the GTP layer, wherein
depending on the content of the IMSI and APN data in the GTP layer, the GTP filter modifies GTP parameters in a GTP control plane for
routing the control plane traffic pertaining to GPRS GTP through the GTP filter, wherein the
data plane traffic is established directly between the serving GPRS support node and a gateway GPRS support node or a Dual/Multi IMSI platform
and, on forwarding a message towards the gateway GPRS support node or towards the Dual/Multi IMSI platform, to populate its own IP address as the origination IP address.

* * * * *